United States Patent
Morini et al.

(10) Patent No.: US 7,202,314 B2
(45) Date of Patent: Apr. 10, 2007

(54) COMPONENTS AND CATALYSTS FOR THE POLYMERIZATION OF OLEFINS

(75) Inventors: Giampiero Morini, Padua (IT); Giulio Balbontin, Savona (IT); Gianni Vitale, Ferrara (IT)

(73) Assignee: Basell Poliolefine Italia S.p.A., Milan (IT)

( * ) Notice: Subject to any disclaimer, the term of this patent is extended or adjusted under 35 U.S.C. 154(b) by 0 days.

(21) Appl. No.: 10/527,298

(22) PCT Filed: Aug. 1, 2003

(86) PCT No.: PCT/EP03/08593

§ 371 (c)(1),
(2), (4) Date: Aug. 24, 2005

(87) PCT Pub. No.: WO2004/024785

PCT Pub. Date: Mar. 25, 2004

(65) Prior Publication Data

US 2006/0105906 A1    May 18, 2006

Related U.S. Application Data

(60) Provisional application No. 60/413,691, filed on Sep. 26, 2002.

(30) Foreign Application Priority Data

Sep. 16, 2002 (EP) .................................. 02078830

(51) Int. Cl.
*C08F 4/42* (2006.01)

(52) U.S. Cl. .................. 526/124.3; 526/124.2; 526/348; 526/142; 526/139; 502/103; 502/121; 502/125; 502/115

(58) Field of Classification Search ............ 526/124.2, 526/124.3, 348, 142, 139; 502/103, 121, 502/125, 115

See application file for complete search history.

(56) References Cited

U.S. PATENT DOCUMENTS

| | | | | |
|---|---|---|---|---|
| 4,784,983 A | * | 11/1988 | Mao et al. | .................... 502/111 |
| 5,726,262 A | * | 3/1998 | Kioka et al. | .............. 526/124.8 |
| 6,376,417 B1 | * | 4/2002 | Yang et al. | .................. 502/121 |

FOREIGN PATENT DOCUMENTS

| | | | |
|---|---|---|---|
| EP | 0855408 | | 7/1998 |
| WO | 0063261 | | 10/2000 |
| WO | WO 00/63261 | * | 10/2000 |
| WO | 03068828 | | 8/2003 |

OTHER PUBLICATIONS

N. R. Long et al., "Isolation and Reactions of the Lithium Di-Enolate of Diethyl Succinate," *Synthetic Communications*, vol. 11(9); p. 687-696 (1981).

M. W. Ratke et al., "The Reaction of Ester Enolates with Copper (II) Salts. A Synthesis of Substituted Succinate Esters," *J. Am. Chem. Soc.*, vol. 93(18), p. 4605-4606 (1971).

* cited by examiner

Primary Examiner—Ling-Sui Choi
(74) *Attorney, Agent, or Firm*—William R Reid

(57) ABSTRACT

The present invention relates to a solid catalyst component for the polymerization of olefins $CH_2=CHR$ in which R is hydrogen or a hydrocarbon radical with 1–12 carbon atoms, comprising Mg, Ti, halogen and an electron donor selected from succinates, said catalyst component being obtainable by a process comprising the following steps: (a) dissolving a halide of magnesium in a solvent system comprising an organic epoxy compound or an organic phosphorus compound and optionally an inert diluent to form a solution; (b) mixing the obtained solution with a titanium compound to form a mixture; (c) precipitating a solid from the mixture obtained in step (b) in the presence of a succinate and/or an auxiliary precipitant; (d) if a succinate is not used in step (c), contacting the solid obtained in (c) with a succinate, and (e) treating the solid obtained in (c) or (d) with a titanium compound optionally in the presence of an inert diluent.

20 Claims, No Drawings

COMPONENTS AND CATALYSTS FOR THE POLYMERIZATION OF OLEFINS

This application is the U.S. national phase of International Application PCT/EP2003/008593, filed Aug. 1, 2003, claiming priority to European Patent Application 02078830.3 filed Sep. 16, 2002, and the benefit under 35 U.S.C. 119(e) of U.S. Provisional Application No. 60/413,691, filed Sep. 26, 2002; the disclosures of International Application PCT/EP2003/008593, European Patent Application 02078830.3 and U.S. Provisional Application No. 60/413,691, each as filed, are incorporated herein by reference.

The present invention relates to catalyst components for the polymerization of olefins, to the catalyst obtained therefrom and to the use of said catalysts in the polymerization of olefins $CH_2$=CHR in which R is hydrogen or a hydrocarbyl radical with 1–12 carbon atoms. In particular the present invention relates to catalyst components, suitable for the stereospecific polymerization of olefins, comprising Ti, Mg, halogen and an electron donor compound selected from esters of succinic acids (hereinafter succinates) obtained by a specific process. Said catalyst components when used in the polymerization of olefins, and in particular of propylene, are capable to give polymers in higher yields with respect to those obtainable with the succinate based catalysts of the prior art.

High-yield catalyst components for the polymerization of olefins, and in particular for propylene, are known in the art. They are generally obtained by supporting, on a magnesium dihalide, a titanium compound and an electron donor compound as a selectivity control agent. Said catalyst components are then used together with an aluminum alkyl and, optionally, another electron donor (external) compound in the stereospecific polymerization of propylene. Depending on the type of electron donor used, the activity and stereospecificity of the catalyst can vary. The catalyst components that comprise phthalates as internal donors and silanes as external donors show a very high catalytic activity, generally above 2000 kg of polymer per g of titanium. The use of certain specific catalyst preparations however, such as those disclosed in U.S. Pat. No. 4,784,983, can lead to a lower activity. Furthermore, the propylene polymers obtained with the phthalate containing catalyst systems usually have a narrow molecular weight distribution (MWD) as compared for example with the propylene polymers prepared by using the conventional catalysts comprising a titanium trichloride based catalyst component. The narrow MWD causes a worsening of the processability of the polymers which involves a decrease of the quality of the products in applications such as molding or thermoforming. WO00/63261 discloses the use of catalyst components, suitable for the stereospecific polymerization of olefins, comprising Ti, Mg, halogen and an internal electron donor compound selected from esters of substituted succinic acids (substituted succinates). These catalyst components used in combination with silanes as external donors allow the preparation of stereoregular propylene polymers with broad MWD. The activities, although of interest, are in certain cases lower than 2000 kg of polymer per g of titanium. It would be therefore desired to have available catalyst components containing succinates as internal donors and endowed with an improved catalytic activity.

The applicant has surprisingly found a solid catalyst component that meets the requirements which comprises titanium, magnesium, halogen and a succinate and is obtainable by a process comprising the following steps:

(a) dissolving a halide of magnesium in a solvent system comprising an organic epoxy compound or an organic phosphorus compound and optionally an inert diluent to form a solution;
(b) mixing the obtained solution with a titanium compound to form a mixture;
(c) precipitating a solid from the mixture obtained in step (b) in the presence of a succinate and/or an auxiliary precipitant;
(d) if a succinate is not used in step (c), contacting the solid obtained in (c) with a succinate, and
(e) treating the solid obtained in (c) or (d) with a titanium compound optionally in the presence of an inert diluent.

The solution disclosed in (a) is obtained by dissolving a halide of magnesium in a solvent system comprising an organic epoxy compounds or organic phosphorus compounds. The solvent system may include inert diluents. According to the present invention the term halide of magnesium include magnesium dihalides such as magnesium dichloride, magnesium dibromide and magnesium diiodide; complexes of magnesium dihalide with Lewis base such as water or alcohol, and derivatives of magnesium halide wherein a halogen atom is substituted by a hydrocarboxyl or halohydrocarboxyl group.

Suitable organic epoxy compounds include oxides of aliphatic olefins, aliphatic diolefins, halogenated aliphatic olefins, and halogenated aliphatic diolefins, glycidyl ethers, cyclic ethers and the like having 2–8 carbon atoms. Examples of suitable organic epoxy compounds are ethylene oxide, propylene oxide, butylene oxide, butadiene dioxide, epoxy chloropropane, methylglycidyl ether, diglycidyl ether, tetrahydrofuran, and the like.

Suitable organic phosphorous compounds include hydrocarbon esters of phosphoric acids such as trimethyl phosphate, triethyl phosphate, tributyl phosphate, triphenyl phosphate, trimethyl phosphate; trimethyl phosphate, triethyl phosphate and tributyl phosphate are preferred while tributyl phosphate is the most preferred.

The particle size of the halide of magnesium used is preferred to be such that it is easily dissolved with stirring. The dissolution temperature is from about 0° to about 100° C., preferably from 30° C. to 70° C. Inert diluents such as hexane, heptane, octane, benzene, toluene, xylene, 1,2-dichloroethane, chlorobenzene and other hydrocarbons or halohydrocarbons can be added into the solvent system. The amount of epoxy compounds added is about 0.2–10.0 moles, preferably 0.5–4.0 moles, per mole of halide of magnesium, and the amount of organic phosphorus compounds added is about 0.1–3.0 moles, preferably 0.3–1.0 moles, per mole of halide of magnesium.

The solution of magnesium halide is mixed with liquid titanium tetrahalide to form a solid precipitate in the presence of an auxiliary precipitant. The succinate may be added before or after the precipitation of the solid and loaded on the solid.

According to the invention, the auxiliary precipitant can be added either after the halide of magnesium solution is obtained or together with the halide of magnesium. The liquid titanium tetrahalide or its derivatives can be in the pure liquid state, or in a solution of inert diluents.

The titanium compound used in the preparation of the solid catalyst component (A) of the invention is preferably a compound having the formula $TiX_n(OR)_{4-n}$ wherein X is a halogen, preferably chlorine, each R is independently a hydrocarbyl group and n is an integer of from 0 to 4.

Examples of preferred titanium compounds are titanium tetrachloride, titanium tetrabromide, titanium tetraiodide, tetrabutoxy titanium, tetraethoxy titanium, chlorotriethoxy titanium, dichlorodiethoxy titanium, trichloroethoxy titanium and the like.

Examples of the solution of magnesium halide and the liquid titanium tetrahalide or its derivatives used in the present invention have been disclosed in U.S. Pat. No. 4,784,983 the relevant part of which is incorporated herein by reference.

The auxiliary precipitant according to this invention includes organic acid anhydrides, organic acids, ketones, aldehydes, ethers and any combination thereof, such as acetic anhydride, phthalic anhydride, succinic anhydride, maleic anhydride, pyromellitic dianhydride, acetic acid, propionic acid, butyric acid, acrylic acid, methacrylic acid, acetone, methyl ethyl ketone, benzophenone, dimethyl ether, diethyl ether, dipropyl ether, dibutyl ether, diamyl ether, 1,3-diethers, succinates and the like. As mentioned before, the step of treating the solid with a succinate may be omitted when the auxiliary precipitant comprises the succinate donor compound. The process of solids precipitation can be carried out by several methods. However, particularly preferred are two methods. One method involves mixing liquid titanium tetrahalide with a halide of magnesium at a temperature in the range of about −40° C. to 0° C., and precipitating the solids while the temperature is raised slowly. The other preferred method involves adding liquid titanium tetrahalide dropwise into the homogeneous halide of magnesium solution at room temperature to precipitate out solids immediately. In both methods, an auxiliary precipitant must be present in the reaction system. The auxiliary precipitant can be added before or after precipitation of the solid starts.

In order to obtain uniform solid particles, the process of precipitation should be carried out slowly. When the second method of adding titanium halide dropwise at room temperature is applied, the process should preferably take place over a period of from about 1 hour to 6 hours. When the first method of raising the temperature in a slow manner is applied, the rate of temperature increase preferably ranges from about 4° C. to about 100° C. per hour.

The mole ratios of various components per mole of magnesium halide in this step are as follow: titanium halide, 0.5–150, preferably 1–20 and auxiliary precipitant, 0.03–1.0, preferably 0.05–1.4.

As mentioned before, if the auxiliary precipitant is not a succinate the precipitated solid must be treated with a succinate. Particularly suitable succinates are those of formula (I):

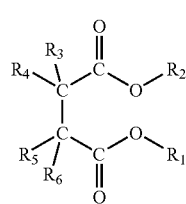

wherein the radicals $R_1$ and $R_2$, equal to, or different from, each other are a $C_1$–$C_{20}$ linear or branched alkyl, alkenyl, cycloalkyl, aryl, arylalkyl or alkylaryl group, optionally containing heteroatoms; the radicals $R_3$ to $R_6$ equal to, or different from, each other, are hydrogen or a $C_1$–$C_{20}$ linear or branched alkyl, alkenyl, cycloalkyl, aryl, arylalkyl or alkylaryl group, optionally containing heteroatoms, and the radicals $R_3$ to $R_6$ can be linked together to form a cycle.

$R_1$ and $R_2$ are preferably $C_1$–$C_8$ alkyl, cycloalkyl, aryl, arylalkyl and alkylaryl groups. Particularly preferred are the compounds in which $R_1$ and $R_2$ are selected from primary alkyls and in particular branched primary alkyls. Examples of suitable $R_1$ and $R_2$ groups are methyl, ethyl, n-propyl, n-butyl, isobutyl, neopentyl, 2-ethylhexyl. Particularly preferred are ethyl, isobutyl, and neopentyl.

One of the preferred groups of compounds described by the formula (I) is that in which $R_3$ to $R_5$ are hydrogen and $R_6$ is a branched alkyl, cycloalkyl, aryl, arylalkyl and alkylaryl radical having from 3 to 10 carbon atoms. Particularly preferred are the compounds in which $R_6$ is a branched primary alkyl group or a cycloalkyl group having from 3 to 10 carbon atoms.

Specific examples of suitable monosubstituted succinate compounds are Diethyl sec-butylsuccinate, Diethyl thexylsuccinate, Diethyl cyclopropylsuccinate, Diethyl norbornylsuccinate, Diethyl perihydrosuccinate, Diethyl trimethylsilylsuccinate, Diethyl methoxysuccinate, Diethyl p-methoxyphenylsuccinate, Diethyl p-chlorophenylsuccinate, diethyl phenylsuccinate, diethyl cyclohexylsuccinate, diethyl benzylsuccinate, diethyl cyclohexylmethylsuccinate, diethyl t-butylsuccinate, diethyl isobutylsuccinate, diethyl isopropylsuccinate, diethyl neopentylsuccinate, diethyl isopentylsuccinate, diethyl (1-trifluoromethylethyl)succinate, diethyl fluorenylsuccinate, 1-(ethoxycarbo diisobutyl phenylsuccinate, Diisobutyl sec-butylsuccinate, Diisobutyl thexylsuccinate, Diisobutyl cyclopropylsuccinate, Diisobutyl norbornylsuccinate, Diisobutyl perihydrosuccinate, Diisobutyl trimethylsilylsuccinate, Diisobutyl methoxysuccinate, Diisobutyl p-methoxyphenylsuccinate, Diisobutyl p-chlorophenylsuccinate, diisobutyl cyclohexylsuccinate, diisobutyl benzylsuccinate, diisobutyl cyclohexylmethylsuccinate, diisobutyl t-butylsuccinate, diisobutyl isobutylsuccinate, diisobutyl isopropylsuccinate, diisobutyl neopentylsuccinate, diisobutyl isopentylsuccinate, diisobutyl (1-trifluoromethylethyl)succinate, diisobutyl fluorenylsuccinate, Dineopentyl sec-butylsuccinate, Dineopentyl thexylsuccinate, Dineopentyl cyclopropylsuccinate, Dineopentyl norbornylsuccinate, Dineopentyl perihydrosuccinate, Dineopentyl trimethylsilylsuccinate, Dineopentyl methoxysuccinate, Dineopentyl p-methoxyphenylsuccinate, Dineopentyl p-chlorophenylsuccinatedineopentyl phenylsuccinate, dineopentyl cyclohexylsuccinate, dineopentyl benzylsuccinate, dineopentyl cyclohexylmethylsuccinate, dineopenthyl t-butylsuccinate, dineopentyl isobutylsuccinate, dineopentyl isopropylsuccinate, dineopentyl neopentylsuccinate, dineopentyl isopentylsuccinate, dineopentyl (1-trifluoromethylethyl)succinate, dineopentyl fluorenylsuccinate.

Another preferred group of compounds within those of formula (I) is that in which at least two radicals from $R_3$ to $R_6$ are different from hydrogen and are selected from $C_1$–$C_{20}$ linear or branched alkyl, alkenyl, cycloalkyl, aryl, arylalkyl or alkylaryl group, optionally containing heteroatoms. Particularly preferred are the compounds in which the two radicals different from hydrogen are linked to the same carbon atom Specific examples of suitable disubstituted succinates are: diethyl 2-,2-dimethylsuccinate, diethyl 2-ethyl-2-methylsuccinate, diethyl 2-Benzyl-2-isopropylsuccinate, Diethyl 2-cyclohexylmethyl-2-isobutylsuccinate, Diethyl 2-cyclopentyl-2-n-butyl succinate, Diethyl 2,2-diisobutylsuccinate, Diethyl 2-cyclohexyl-2-ethylsuccinate, Diethyl 2-isopropyl-2-methylsuccinate, Diethyl 2-tetradecyl-2 ethyl succinate, Diethyl 2-isobutyl-2-ethylsuccinate, Diethyl 2-(1-trifluoromethyl-ethyl)-2-methylsuccinate, Diethyl 2-isopentyl-2-isobutylsuccinate, Diethyl 2-phenyl 2-n-butylsuccinate, diisobutyl 2-,2-dimethylsuccinate, diisobutyl 2-ethyl-2-methylsuccinate, Diisobutyl 2-benzyl-2 isopropylsuccinate, Diisobutyl 2-cyclohexylmethyl-2-isobutylsuccinate, Diisobutyl 2-cyclopentyl-2-n-butylsuccinate, Diisobutyl 2,2-diisobutylsuccinate, Diisobutyl 2-cyclohexyl-2-ethylsuccinate, Diisobutyl 2-isopropyl-2-methylsuccinate, Diisobutyl 2-tetradecyl-2-ethylsuccinate, Diisobutyl 2-isobutyl-2-ethylsuccinate, Diisobutyl 2-(1-trifluoromethyl-ethyl)-2-methylsuccinate, Diisobutyl 2-isopentyl-2-isobutylsuccinate, Diisobutyl 2-phenyl 2-nButylsuccinate, dineopentyl 2-,2-dimethylsuccinate, dineopentyl 2-ethyl-2-methylsuccinate, Dineopentyl 2-Benzyl-2 isopropylsuccinate, Dineopentyl 2-cyhexylmethyl-2-isobutylsuccinate, Dineopentyl 2-cyclopentyl-2-n-butylsuccinate, Dineopentyl 2,2-diisobutylsuccinate, Dineopentyl 2-cyclohexyl-2-ethylsuccinate, Dineopentyl 2-isopropyl-2-methylsuccinate, Dineopentyl 2-tetradecyl-2 ethylsuccinate, Dineopentyl 2-isobutyl-2-ethylsuccinate, Dineopentyl 2-(1-trifluoromethyl-ethyl)-2-methylsuccinate, Dineopentyl 2-isopentyl-2-isobutylsuccinate, Dineopentyl 2-phenyl 2-n-butylsuccinate.

Furthermore, also the compounds in which at least two radicals different from hydrogen are linked to different carbon atoms, that is $R_3$ and $R_5$ or $R_4$ and $R_6$ are particularly preferred.

Specific examples of suitable compounds are Diethyl 2,3bis(trimethylsilyl)succinate, Diethyl 2,2-secbutyl-3-methylsuccinate, Diethyl 2-(3,3,3,trifluoropropyl)-3-methylsuccinate, Diethyl 2,3 bis(2-ethyl-butyl)succinate, Diethyl 2,3-diethyl-2-isopropylsuccinate, Diethyl 2,3-diisopropyl-2-methylsuccinate, Diethyl 2,3-dicyclohexyl-2-methyl diethyl 2,3-dibenzylsuccinate, diethyl 2,3-diisopropylsuccinate, diethyl 2,3-bis(cyclohexylmethyl)succinate, Diethyl 2,3-di-t-butylsuccinate, Diethyl 2,3-diisobutylsuccinate, Diethyl 2,3-dineopentylsuccinate, Diethyl 2,3-diisopentylsuccinate, Diethyl 2,3-(1-trifluoromethyl-ethyl)succinate, Diethyl 2,3-tetradecylsuccinate, Diethyl 2,3-fluorenylsuccinate, Diethyl 2-isopropyl-3-isobutylsuccinate, Diethyl 2-terbutyl-3-isopropylsuccinate, Diethyl 2-ipropyl-3-cyclohexylsuccinate, Diethyl 2-isopentyl-3-cyclohexylsuccinate, Diethyl 2-tetradecyl-3-cyclohexylmethylsuccinate, Diethyl 2-cyclohexyl-3-cyclopentylsuccinate, Diethyl 2,2,3,3-tetramethylsuccinate, Diethyl 2,2,3,3-tetraethylsuccinate, Diethyl 2,2,3,3 tetrapropylsuccinate, Diethyl 2,3-diethyl-2,3-diisopropylsuccinate, Diethyl 2,2,3,3 tetrafluorosuccinate, Diisobutyl 2,3bis(trimethylsilyl)succinate, Diisobutyl 2,2-secbutyl-3-methylsuccinate, Diisobutyl 2-(3,3,3,trifluoropropyl)-3-methylsuccinate, Diisobutyl 2,3 bis(2-ethyl-butyl)succinate, Diisobutyl 2,3-diethyl-2-isopropylsuccinate, Diisobutyl 2,3-diisopropyl-2-methylsuccinate, Diisobutyl 2,3-dicyclohexyl-2-methyl,diisobutyl 2,3-dibenzylsuccinate, diisobutyl 2,3-diisopropylsuccinate, diisobutyl 2,3-bis(cyclohexylmethyl)succinate, Diisobutyl 2,3-di-t-butylsuccinate, Diisobutyl 2,3-diisobutylsuccinate, Diisobutyl 2,3-dineopentylsuccinate, Diisobutyl 2,3-diisopentylsuccinate, Diisobutyl 2,3-(1-trifluoromethyl-ethyl)succinate, Diisobutyl 2,3-tetradecylsuccinate, Diisobutyl 2,3-fluorenylsuccinate, Diisobutyl 2-ipropyl-3-ibutylsuccinate, Diisobutyl 2-terbutyl-3-ipropylsuccinate, Diisobutyl 2-ipropyl-3-cyclohexylsuccinate, Diisobutyl 2-isopentyl-3-cyclohexylsuccinate, Diisobutyl 2-tetradecyl-3-cyclohexylmethylsuccinate, Diisobutyl 2-cyclohexyl-3-cyclopentylsuccinate, Diisobutyl 2,2,3,3-tetramethylsuccinate, Diisobutyl 2,2,3,3-tetraethylsuccinate, Diisobutyl 2,2,3,3-tetrapropylsuccinate, Diisobutyl 2,3-diethyl-2,3-diisopropylsuccinate, Diisobutyl 2,2,3,3 tetrafluorosuccinate, Dineopentyl 2,3bis(trimethylsilyl)succinate, Dineopentyl 2,2-secbutyl-3-methylsuccinate, Dineopentyl 2-(3,3,3,trifluoropropyl)-3-methylsuccinate, Dineopentyl 2,3 bis(2-ethyl-butyl)succinate, Dineopentyl 2,3-diethyl-2-isopropylsuccinate, Dineopentyl 2,3-diisopropyl-2-methylsuccinate, Dineopentyl 2,3-dicyclohexyl-2-methyl, dineopentyl 2,3-dibenzylsuccinate, dineopentyl 2,3-diisopropylsuccinate, dineopentyl 2,3-bis(cyclohexylmethyl)succinate, Dineopentyl 2,3-di-t-butylsuccinate, Dineopentyl 2,3-diisobutylsuccinate, Dineopentyl 2,3-dineopentylsuccinate, Dineopentyl 2,3-diisopentylsuccinate, Dineopentyl 2,3-(1-trifluoromethyl-ethyl)succinate, Dineopentyl 2,3-tetradecylsuccinate, Dineopentyl 2,3-fluorenylsuccinate, Dineopentyl 2-ipropyl-3-ibutylsuccinate, Dineopentyl 2-terbutyl-3-isopropylsuccinate, Dineopentyl 2-isopropyl-3-cyclohexylsuccinate, Dineopentyl 2-isopentyl-3-cyclohexylsuccinate, Dineopentyl 2-tetradecyl-3-cyclohexylmethyl succinate, Dineopentyl 2-cyclohexyl-3-cyclopentylsuccinate, Dineopentyl 2,2,3,3-tetramethylsuccinate, Dineopentyl 2,2,3,3-tetraethylsuccinate, Dineopentyl 2,2,3,3 tetrapropylsuccinate, Dineopentyl 2,3-diethyl-2,3-diisopropylsuccinate, Dineopentyl 2,2,3,3 tetrafluorosuccinate.

As mentioned above the compounds according to formula (I) in which two or four of the radicals $R_3$ to $R_6$ which are joined to the same carbon atom are linked together to form a cycle are also preferred.

Specific examples of suitable compounds are 1-(ethoxycarbonyl)-1-(Ethoxyacetyl)-2,6-dimethyl cyclohexane, 1-(ethoxycarbonyl)-1-(Ethoxyacetyl)-2,5-dimethyl cyclopentane, 1-(ethoxycarbonyl)-1-(Ethoxyacetylmethyl)-2-methyl cyclohexane, 1-(ethoxycarbonyl)-1-(Ethoxyacetylcyclohexyl) cyclohexane.

It is easily derivable for the ones skilled in the art that all the above mentioned compounds can be used either in form of pure isomers or in the form of mixtures of enantiomers, or mixture of regioisomers and enantiomers. When a pure isomer is to be used it is normally isolated using the common techniques known in the art. In particular some of the succinates of the present invention can be used as a pure rac or meso forms or, in alternative, as a mixture of these two forms.

The succinate treated solid precipitate is first separated from the mixture. In the solid precipitate thus obtained can be entrained a variety of complexes and impurities, so that further treatment may be necessary. Accordingly, the solid precipitates are treated with a titanium compound, preferably titanium tetrahalide or a mixture of titanium tetrahalide and an inert diluent, and then washed with an inert diluent. The amount of titanium compound used is 1 to 20 moles, preferably 2 to 15 moles, per mole of halide of magnesium. The treatment temperature ranges from 50° C. to 150° C., preferably from 60° C. to 100° C. If a mixture of titanium tetrahalide and inert diluent is used to treat the solid precipitate, the amount of titanium tetrahalide in the treating solution is 10–99 percent by vol., preferably 20–80 percent, the rest being an inert diluent. The treated solids are further washed with an inert diluent to remove ineffective titanium compounds and other impurities.

The catalyst component (A) according to the present invention which is obtained through the above described steps can be used as a solid or as a suspension.

The solid catalyst components (A) according to the present invention are converted into catalysts for the polymerization of olefins by reacting them with (B) organoaluminum compounds according to known methods.

Preferred organoaluminum compounds are the alkyl-Al compounds which are preferably selected from the trialkyl aluminum compounds such as for example triethylaluminum, triisobutylaluminum, tri-n-butylaluminum, tri-n-hexylaluminum, tri-n-octylaluminum. It is also possible to use mixtures of trialkylaluminum's with alkylaluminum halides, alkylaluminum hydrides or alkylaluminum sesquichlorides such as AlEt$_2$Cl and Al$_2$Et$_3$Cl$_3$. In the catalyst system of the invention, the molar ratio of aluminium in component (B) to titanium in component (A) is from 5 to 1000, preferably from 100 to 800, and the molar ratio of silicon in component (C) to titanium in component (A) is from 2 to 100, preferably from 8 to 32.

When polymers having a very high isotactic index are required the use of an external donor compound is normally advisable. The external donor (C) can be of the same type or it can be different from the succinate of formula (I). Preferred external electron-donor compounds include silicon compounds, ethers, esters such as ethyl 4-ethoxybenzoate, amines, heterocyclic compounds and particularly 2,2,6,6-tetramethyl piperidine, ketones and the 1,3-diethers of the general formula (II):

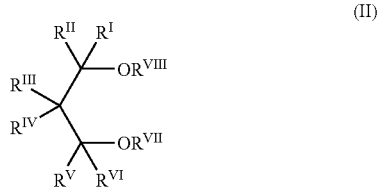

(II)

wherein $R^I$, $R^{II}$, $R^{III}$, $R^{IV}$, $R^V$ and $R^{VI}$ equal or different to each other, are hydrogen or hydrocarbon radicals having from 1 to 18 carbon atoms, and $R^{VII}$ and $R^{VIII}$, equal or different from each other, have the same meaning of $R^I$–$R^{VI}$ except that they cannot be hydrogen; one or more of the $R^I$–$R^{VIII}$ groups can be linked to form a cycle. Particularly preferred are the 1,3-diethers in which $R^{VII}$ and $R^{VIII}$ are selected from $C_1$–$C_4$ alkyl radicals.

Another class of preferred external donor compounds is that of silicon compounds of formula $R_a^5 R_b^6 Si(OR^7)_c$, where a and b are integer from 0 to 2, c is an integer from 1 to 3 and the sum (a+b+c) is 4; $R^5$, $R^6$, and $R^7$, are alkyl, cycloalkyl or aryl radicals with 1–18 carbon atoms optionally containing heteroatoms. Particularly preferred are the silicon compounds in which a is 1, b is 1, c is 2, at least one of $R^5$ and $R^6$ is selected from branched alkyl alkenyl, alkylen, cycloalkyl or aryl groups with 3–10 carbon atoms optionally containing heteroatoms and $R^7$ is a $C_1$–$C_{10}$ alkyl group, in particular methyl. Examples of such preferred silicon compounds are methylcyclohexyldimethoxysilane, diphenyldimethoxysilane, methyl-t-butyldimethoxysilane, dicyclopentyldimethoxysilane, 2-ethylpiperidinyl-2-t-butyldimethoxysilane and 1,1,1,trifluoropropyl-2-ethylpiperidinyl-dimethoxysilane and 1,1,1,trifluoropropyl-metil-dimethoxysilane. Moreover, are also preferred the silicon compounds in which a is 0, c is 3, $R^6$ is a branched alkyl or cycloalkyl group, optionally containing heteroatoms, and $R^7$ is methyl. Examples of such preferred silicon compounds are cyclohexyltrimethoxysilane, t-butyltrimethoxysilane and thexyltrimethoxysilane.

The electron donor compound (c) is used in such an amount to give a molar ratio between the organoaluminum compound and said electron donor compound (c) of from 0.1 to 500, preferably from 1 to 300 and more preferably from 3 to 100. As previously indicated, when used in the (co) polymerization of olefins, and in particular of propylene, the catalysts of the invention allow to obtain, very high yields and polymers endowed with a broad MWD.

As mentioned above all these catalysts can be used in the processes for the polymerization of olefins CH$_2$=CHR, in which R is hydrogen or a hydrocarbyl radical with 1–12 carbon atoms.

The preferred alpha-olefins to be (co)polymerized are ethylene, propylene, butene-1, 4-methyl-1-pentene and hexene-1. In particular, the above described catalysts have been used in the (co)polymerization of propylene and ethylene to prepare different kinds of products. For example the following products can be prepared: high density ethylene polymers (HDPE, having a density higher than 0.940 g/cm$^3$), comprising ethylene homopolymers and copolymers of ethylene with alpha-olefins having 3–12 carbon atoms; linear low density polyethylenes (LLDPE, having a density lower than 0.940 g/cm$^3$) and very low density and ultra low density (VLDPE and ULDPE, having a density lower than 0.920 g/cm$^3$, to 0.880 g/cm$^3$ cc) consisting of copolymers of ethylene with one or more alpha-olefins having from 3 to 12 carbon atoms, having a mole content of units derived from the ethylene higher than 80%; elastomeric copolymers of ethylene and propylene and elastomeric terpolymers of ethylene and propylene with smaller proportions of a diene having a content by weight of units derived from the ethylene comprised between about 30 and 70%, isotactic polypropylenes and crystalline copolymers of propylene and ethylene and/or other alpha-olefins having a content of units derived from propylene higher than 85% by weight (random copolymers); shock resistant polymers of propylene obtained by sequential polymerization of propylene and mixtures of propylene with ethylene, containing up to 30% by weight of ethylene; copolymers of propylene and 1-butene having a number of units derived from 1-butene comprised between 10 and 40% by weight.

Any kind of polymerization process can be used with the catalysts of the invention that are very versatile. The polymerization can be carried out for example in slurry using as diluent an inert hydrocarbon solvent, or in bulk using the liquid monomer (for example propylene) as a reaction medium. Moreover, it is possible to carry out the polymerization process in gas-phase operating in one or more fluidized or mechanically agitated bed reactors.

The catalyst of the present invention can be used as such in the polymerization process by introducing it directly into the reactor. In the alternative, the catalyst can be pre-polymerized before being introduced into the first polymerization reactor. The term pre-polymerized as used in the art, means a catalyst which has been subject to a polymerization step at a low conversion degree. According to the present invention a catalyst is considered to be pre-polymerized when the amount the polymer produced is from about 0.1 up to about 1000 g per gram of solid catalyst component.

The pre-polymerization can be carried out with the alpha olefins selected from the same group of olefins disclosed before. In particular, it is especially preferred pre-polymerizing ethylene or mixtures thereof with one or more α-olefins in an amount up to 20% by mole. Preferably, the conversion of the pre-polymerized catalyst component is from about 0.2 g up to about 500 g per gram of solid catalyst component.

The pre-polymerization step can be carried out at temperatures from 0 to 80° C. preferably from 5 to 50° C. in liquid or gas-phase. The pre-polymerization step can be performed in-line as a part of a continuous polymerization process or separately in a batch process. The batch pre-polymerization of the catalyst of the invention with ethylene in order to produce an amount of polymer ranging from 0.5 to 20 g per gram of catalyst component is particularly preferred.

The polymerization is generally carried out at temperature of from 20 to 120° C., preferably of from 40 to 80° C. When the polymerization is carried out in gas-phase the operating pressure is generally between 0.5 and 10 MPa, preferably between 1 and 5 MPa. In the bulk polymerization the operating pressure is generally between 1 and 6 MPa preferably between 1.5 and 4 MPa. Hydrogen or other compounds capable to act as chain transfer agents can be used to control the molecular weight of polymer.

The following examples are given in order to better illustrate the invention without limiting it.

EXAMPLES

Characterization

Preparation of Succinates

Succinates can be prepared according to known methods described in the literature, (see for example N. R. Long, M. W. Rathke, Synthetic commun. 11, 687, 1981. M. W. Ratke, A. Lindert, J. Am. Chem. Soc. 93, 4605, 1971).

Propylene Polymerization: General Procedure

In a 4 liter autoclave, purged with nitrogen flow at 70° C. for one our, 75 ml of anhydrous hexane containing 800 mg of AlEt$_3$, 79.8 mg of dicyclopentyldimethoxysilane and 10 mg of solid catalyst component were introduced in propylene flow at 30° C. The autoclave was closed. 1.5 Nl of hydrogen were added and then, under stirring, 1.2 Kg of liquid propylene were fed. The temperature was raised to 70° C. in five minutes and the polymerization was carried out at this temperature for two hours. The nonreacted propylene was removed, the polymer was recovered and dried at 70° C. under vacuum for three hours and, then, weighed and fractionated with o-xylene to determine the amount of the xylene insoluble (X.I.) fraction at 25° C.

Determination of X.I.

2.5 g of polymer were dissolved in 250 ml of o-xylene under stirring at 135° C. for 30 minutes, then the solution was cooled to 25° C. and after 30 minutes the insoluble polymer was filtered. The resulting solution was evaporated in nitrogen flow and the residue was dried and weighed to determine the percentage of soluble polymer and then, by difference the xylene insoluble fraction (%).

Determination of Polydispersity Index "P.I."

This property is strictly connected with the molecular weight distribution of the polymer under examination. In particular it is inversely proportional to the creep resistance of the polymer in the molten state. Said resistance called modulus separation at low modulus value (500 Pa), was determined at a temperature of 200° C. by using a parallel plates rheometer model RMS-800 marketed by RHEOMETRICS (USA), operating at an oscillation frequency which increases from 0.1 rad/sec to 100 rad/second. From the modulus separation value, one can derive the P.I. by way of the equation:

$$P.I.=54.6*(\text{modulus separation})^{-1.76}$$

in which the modulus separation is defined as:

modulus separation=frequency at $G'$=500 Pa/frequency at $G''$=500 Pa wherein $G'$ is storage modulus and $G''$ is the loss modulus.

Example 1

Preparation of solid catalyst component

Anhydrous magnesium chloride (5 g), toluene (100 ml), epoxy chloropropane (EPC) (4 ml) and tributyl phosphate (TBP) (14 ml) were introduced into a reactor which has thoroughly been purged with highly purified nitrogen. The temperature was raised to 50° C. with stirring, and the mixture was then maintained at that temperature for 3 hours, while the solids were dissolved completely. Phthalic anhydride (1.2 g) was added to the solution, and then the solution was maintained for an additional 1 hour at 50° C. The solution was cooled to −25° C.

Then titanium tetrachloride (60 ml) was added dropwise over a course of 1 hour while the mixture was kept under stirring. The solution was slowly heated to 80° C., while a solid product is precipitated. Di-n-butyl succinate (8 mmoles) was added and the mixture was maintained at the temperature of 80° C. for 1 hour. The stirring was discontinued, the liquid portion siphoned off and the resulting solid portion was collected by filtration and washed at 110° C. with toluene (2 times 100 ml each). A brown-yellow solid precipitate was obtained. The solid was then dispersed in toluene (60 ml) and titanium tetrachloride (60 ml) for 2 hours at 90° C. After that, the stirring was discontinued, the liquid portion siphoned off and the resulting solid portion was subject to another treatment with toluene and titanium tetrachloride under the same conditions. The solid obtained was washed with toluene (3.times.100 ml), and then with hexane (4.times.100 ml) to obtain 6.3 g of a solid which contained 2.45% by weight of titanium and 10.7% by weight of di-n-butyl succinate. The so obtained catalyst was then used in the polymerization of propylene according to the general procedure reported above. The results are shown in Table 2.

Example 2

The same procedure disclosed in example 1 was replicated with the difference that diethyl cyclohexylsuccinate was used instead di-n-butyl succinate. The characteristics of the catalyst are reported in table 1. The so obtained catalyst was then used in the polymerization of propylene according to the general procedure reported above. The results are shown in Table 2.

Example 3

The same procedure disclosed in example 1 was replicated with the difference that diethyl 2-ethyl-2-methylsuccinate was used instead di-n-butyl succinate. The characteristics of the catalyst are reported in table 1. The so obtained catalyst was then used in the polymerization of propylene according to the general procedure reported above. The results are shown in Table 2.

Example 4

The same procedure disclosed in example 1 was replicated with the difference that diethyl 2,3-diisopropylsuccinate was used instead di-n-butyl succinate. The characteristics of the catalyst are reported in table 1. The so obtained catalyst was then used in the polymerization of propylene according to the general procedure reported above. The results are shown in Table 2.

Example 5

The same procedure disclosed in example 1 was replicated with the difference that diisobutyl 2,3-diisopropylsuccinate was used instead di-n-butyl succinate. The characteristics of the catalyst are reported in Table 1. The so obtained catalyst was then used in the polymerization of propylene according to the general procedure reported above. The results are shown in Table 2.

TABLE 1

| | Succinate | | Ti |
|---|---|---|---|
| Ex. | | Wt % | Wt % |
| 1 | Di-n-butyl succinate | 10.7 | 2.45 |
| 2 | Diethyl cyclohexylsuccinate | 13.9 | 2.6 |
| 3 | Diethyl 2-ethyl-2-methylsuccinate | 12.1 | 2.2 |
| 4 | Diethyl 2,3-diisopropylsuccinate | 16.2 | 3 |
| 5 | Diisobutyl 2,3-diisopropylsuccinate | 19.6 | 3 |

TABLE 2

| Example n. | Yield KgPP/gTit | XI Wt % | P.I. |
|---|---|---|---|
| 1 | 530 | 96.2 | 4.7 |
| 2 | 1500 | 97.6 | 4.8 |
| 3 | 2501 | 97.2 | 5.0 |
| 4 | 2333 | 98.5 | 6.0 |
| 5 | 2533 | 98.8 | 5.5 |

The invention claimed is:

1. A solid catalyst component for the (co)polymerization of olefins comprising titanium, magnesium, halogen and a succinate, which is obtained by a process comprising the following steps:
   (a) dissolving a halide of magnesium in a solvent system comprising an organic epoxy compound or an organic phosphorus compound and optionally an inert diluent, thereby forming a solution;
   (b) mixing the solution of step (a) with a titanium compound, thereby forming a mixture;
   (c) precipitating a first solid from the mixture of step (b) in the presence of a succinate, an auxiliary precipitant, or mixtures thereof;
   (d) if a succinate is not used in step (c), contacting the first solid of step (c) with a succinate, thereby forming a second solid, and
   (e) treating the solid of step (c) or (d) with a titanium compound optionally in the presence of an inert diluent.

2. The catalyst component according to claim 1 wherein the auxiliary precipitant is selected from organic anhydrides, organic acids, ethers, aldehydes and ketones.

3. The catalyst component according to claim 1 wherein the auxiliary precipitant is selected from acetic anhydride, phthalic anhydride, succinic anhydride, maleic anhydride, pyromellitic dianhydride, acetic acid, propionic acid, butyric acid, acrylic acid, methacrylic acid, acetone, methyl ethyl ketone, benzophenone, dimethyl ether, diethyl ether, dipropyl ether, dibutyl ether, diamyl ether and mixtures thereof.

4. The catalyst component according to claim 1 wherein the halide of magnesium is magnesium dichloride.

5. The catalyst component according to claim 1 wherein the organic epoxy compound is selected from the group consisting of oxides of aliphatic olefins, aliphatic diolefins, halogenated aliphatic olefins, halogenated aliphatic diolefins, glycidyl ethers, and cyclic ethers, the organic epoxy compound having 2–8 carbon atoms.

6. The catalyst component according to claim 1 wherein the titanium compound has the formula $TiX_n(OR)_{4-n}$ wherein X is a halogen, each R is independently a hydrocarbyl group and n is an integer of from 0 to 4.

7. The catalyst component according to claim 6 wherein the titanium compound is selected from the group consisting of titanium tetrachloride, titanium tetrabromide, titanium tetraiolide, tetrabutoxy titanium, tetraethoxy titanium, chlorotriethoxy titanium, dichlorodiethoxy titanium, and trichloroethoxy titanium.

8. The catalyst component according to claim 1 wherein the succinate is selected from those having the formula (I):

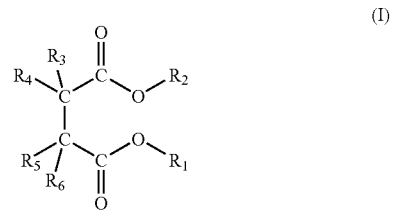

(I)

wherein the radicals $R_1$ and $R_2$, equal to or different from each other, are a $C_1$–$C_{20}$ linear or branched alkyl, alkenyl, cycloalkyl, aryl, arylalkyl or alkylaryl group, optionally containing heteroatoms; the radicals $R_3$ to $R_6$ equal to or different from each other, are hydrogen or a $C_1$–$C_{20}$ linear or branched alkyl, alkenyl, cycloalkyl, aryl, arylalkyl or alkylaryl group, optionally containing heteroatoms, further, the radicals $R_3$ to $R_6$ can be linked together to form a cycle.

9. The catalyst component according to claim 8 wherein in the succinate of formula (I), $R_1$ and $R_2$ are $C_1$–$C_8$ alkyl, cycloalkyl, aryl, arylalkyl and alkylaryl groups.

10. The catalyst component according to claim 8 wherein in the succinate of formula (I), $R_3$ to $R_5$ are hydrogen and $R_6$ is a branched alkyl, cycloalkyl, aryl, arylalkyl and alkylaryl radical having from 3 to 10 carbon atoms.

11. The catalyst component according to claim 8 wherein in the succinate of formula (I), at least two radicals from $R_3$ to $R_6$ are different from hydrogen and are selected from $C_1$–$C_{20}$ linear or branched alkyl, alkenyl, cycloalkyl, aryl, arylalkyl or alkylaryl group, optionally containing heteroatoms.

12. The catalyst component according to claim 11 wherein in the succinate of formula (I), the at least two radicals from $R_3$ to $R_6$ different from hydrogen are linked to different carbon atoms.

13. A catalyst for the polymerization of olefins $CH_2=CHR$, in which R is hydrogen or a hydrocarbyl radical with 1–12 carbon atoms, comprising the product of the reaction between: (A) a solid catalyst component comprising titanium, magnesium, halogen and a succinate, which is obtained by a process comprising the following steps:
   (a) dissolving a halide of magnesium in a solvent system comprising an organic epoxy compound or an organic phosphorus compound and optionally an inert diluent, thereby forming a solution;
   (b) mixing the solution of step (a) with a titanium compound, thereby forming a mixture;
   (c) precipitating a first solid from the mixture of step (b) in the presence of a succinate, an auxiliary precipitant or mixtures thereof;

(d) if a succinate is not used in step (c), contacting the first solid of step (c) with a succinate, thereby forming a second solid, and (e) treating the solid of step (c) with a titanium compound optionally in the presence of an inert diluent;

(B) an alkylaluminum compound; and, optionally, (C) at least one electron-donor compound (external donor).

14. The catalyst according to claim 13 in which the alkylaluminum compound (B) is a trialkyl aluminum compound.

15. The catalyst according to claim 13 in which the external donor (C) is a silicon compound of formula $R_a^5R_b^6Si(OR^7)_c$, where a and b are integers from 0 to 2, c is an integer from 1 to 4 and the sum (a+b+c) is 4; $R^5$, $R^6$ and $R^7$ are alkyl, cycloalkyl or aryl radicals with 1–18 carbon atoms optionally containing heteroatoms.

16. The catalyst according to claim 15 in which a is 1, b is 1 and c is 2.

17. The catalyst according to claim 15 in which at least one of $R^5$ and $R^6$ are branched alkyl, cycloalkyl or aryl groups with 3–10 carbon atoms optionally containing heteroatoms and $R^7$ is a $C_1$–$C_{10}$ alkyl group.

18. The catalyst according to claim 15 in which a is 0, c is 3 and $R^6$ is a branched alkyl or cycloalkyl group and $R^7$ is methyl.

19. The catalyst according to claim 17 wherein the $C_1$–$C_{10}$ alkyl group is methyl.

20. A process for the (co)polymerization of olefins $CH_2$=CHR, in which R is hydrogen or a hydrocarbyl radical with 1–12 carbon atoms, carried out in the presence of a catalyst comprising the product of the reaction between:

(A) a solid catalyst component comprising titanium, magnesium, halogen and a succinate, which is obtained by a process comprising the following steps:

(a) dissolving a halide of magnesium in a solvent system comprising an organic epoxy compound or an organic phosphorus compound and optionally an inert diluent thereby forming a solution;

(b) mixing the solution of step (a) with a titanium compound, thereby forming a mixture;

(c) precipitating a first solid from the mixture of step (b) in the presence of a succinate, an auxiliary precipitant, or the mixtures thereof;

(d) if a succinate is not used in step (c), contacting the solid of step (c) with a succinate, thereby forming a second solid, and (e) treating the solid of step (c) or (d) with a titanium compound optionally in the presence of an inert diluent; and (B) an alkylaluminum compound; and, optionally, (C) at least one electron-donor compound (external donor).

* * * * *